(12) United States Patent
Gruendl et al.

(10) Patent No.: US 7,989,991 B2
(45) Date of Patent: Aug. 2, 2011

(54) LINEAR ACTUATOR

(75) Inventors: Andreas Gruendl, Starnberg (DE); Bernhard Hoffmann, Starnberg (DE)

(73) Assignee: Compact Dynamics, GmbH, Starnberg (DE)

( * ) Notice: Subject to any disclaimer, the term of this patent is extended or adjusted under 35 U.S.C. 154(b) by 766 days.

(21) Appl. No.: 11/911,638

(22) Filed: Jun. 10, 2008

(65) Prior Publication Data

US 2008/0284259 A1   Nov. 20, 2008

Related U.S. Application Data

(63) Continuation of application No. PCT/EP2006/002905, filed on Mar. 30, 2006.

(30) Foreign Application Priority Data

Apr. 15, 2005 (DE) .................. 10 2005 017 481

(51) Int. Cl.
*H02K 1/12* (2006.01)
(52) U.S. Cl. ............... 310/12.04; 310/12.15; 310/12.24; 310/216.029
(58) Field of Classification Search .......... 310/12.01, 310/12.02, 12.04, 12.14, 12.15, 12.21, 12.24, 310/15, 22, 24, 216.023–216.029, 216.031, 310/216.032
See application file for complete search history.

(56) References Cited

U.S. PATENT DOCUMENTS

| | | | |
|---|---|---|---|
| 2,892,140 A | 6/1959 | Praeg | |
| 3,853,102 A | 12/1974 | Myers et al. | |
| 3,921,017 A * | 11/1975 | Hallerback | 310/216.027 |
| 3,983,434 A * | 9/1976 | Sims | 310/216.003 |
| 4,249,099 A * | 2/1981 | Bhongbhibhat et al. | 310/216.029 |
| 4,614,170 A | 9/1986 | Pischinger et al. | |
| 4,638,389 A | 1/1987 | Barth | |
| 4,829,947 A | 5/1989 | Lequesne | |
| 4,878,464 A | 11/1989 | Richeson, Jr. et al. | |
| 4,883,025 A | 11/1989 | Richeson, Jr. | |
| 4,915,015 A | 4/1990 | Richeson et al. | |
| 4,917,056 A | 4/1990 | Yagi et al. | |

(Continued)

FOREIGN PATENT DOCUMENTS

DE     30 30 910 A1   3/1981

(Continued)

OTHER PUBLICATIONS

U.S. Appl. No. 11/911,632, Unpublished, Gründl et al.

(Continued)

*Primary Examiner* — Dang D Le
(74) *Attorney, Agent, or Firm* — Thomas R. FitzGerald, Esq.; Hiscock & Barclay, LLP

(57) ABSTRACT

A linear actuator is provided with an armature and a stator. The armature has at least two stacks of permanently magnetic rods one over another, the stacks being arranged at a predetermined distance from each other. The stator is at least partly produced from a soft magnetic material, and comprises at least two pairs of teeth with teeth opposite each other, each pair of teeth receiving one of the two stacks between them while forming an air gap. The stator has at least two magnetically conducting inner areas which are located between the two stacks and arranged at a predetermined distance from each other in the direction of motion of the armature. The inner areas are each at least partially surrounded by a substantially hollow cylindrical coil arrangement, the central longitudinal axis of which is oriented substantially transversely to the direction of motion of the armature.

12 Claims, 4 Drawing Sheets

U.S. PATENT DOCUMENTS

| | | | |
|---|---|---|---|
| 4,934,348 A | 6/1990 | Yagi et al. | |
| 4,967,702 A | 11/1990 | Richeson et al. | |
| 4,991,548 A | 2/1991 | Richeson et al. | |
| 5,069,422 A | 12/1991 | Kawamura | |
| 5,129,369 A | 7/1992 | Kawamura | |
| 5,218,250 A * | 6/1993 | Nakagawa | 310/12.21 |
| 5,245,232 A | 9/1993 | Nihei et al. | |
| 5,406,241 A | 4/1995 | Kawamura | |
| 5,654,596 A * | 8/1997 | Nasar et al. | 310/12.15 |
| 5,818,680 A | 10/1998 | Schmitz et al. | |
| 5,820,104 A * | 10/1998 | Koyano et al. | 251/326 |
| 6,039,014 A | 3/2000 | Hoppie | |
| 6,067,789 A | 5/2000 | Dobbeling et al. | |
| 7,048,076 B2 | 5/2006 | Cecchin et al. | |
| 7,476,990 B2 * | 1/2009 | Nakagawa et al. | 310/15 |
| 2003/0111029 A1 | 6/2003 | Gründl et al. | |
| 2005/0076517 A1 | 4/2005 | Steffen et al. | |
| 2009/0072675 A1 * | 3/2009 | Kanehara | 310/49 R |

FOREIGN PATENT DOCUMENTS

| | | |
|---|---|---|
| DE | 35 00 530 A1 | 7/1986 |
| DE | 37 23 979 A1 | 2/1988 |
| DE | 691 19 703 T2 | 10/1996 |
| DE | 100 25 371 A1 | 11/2001 |
| DE | 10 2004 003 220 A1 | 2/2005 |
| DE | 103 60 713 A1 | 7/2005 |
| EP | 0 244 878 B1 | 11/1987 |
| EP | 0 485 231 A1 | 5/1992 |
| EP | 1 263 122 A1 | 12/2002 |
| JP | 58-165656 | 9/1983 |
| JP | 2-246761 | 10/1990 |
| JP | 03-092518 A | 4/1991 |
| JP | 8-23669 | 1/1996 |
| JP | 10-174418 | 6/1998 |
| JP | 2004-040990 | 2/2004 |
| WO | WO 90/07635 | 7/1990 |
| WO | WO 90/07637 | 7/1990 |
| WO | WO 98/55741 | 12/1998 |

OTHER PUBLICATIONS

U.S. Appl. No. 11/911,635, Unpublished, Gründl et al.

* cited by examiner

LINEAR ACTUATOR

CROSS-REFERENCE TO RELATED APPLICATIONS

This is a continuation of International Patent Application No. PCT/EP2006/002905, filed Mar. 30, 2006.

BACKGROUND OF THE INVENTION

This invention concerns a linear actuator, which is to be operated electrically, with a rotor and a stator, the rotor being set up to act on an element which is to be moved.

PRIOR ART

From JP-A-3-92518, a drive device is known, the stator in said drive device being constructed of two approximately semi-cylindrical shells, which both in the circumferential direction and in the longitudinal direction of each shell have divided teeth which face the rotor. The individual teeth of each shell are each surrounded by a coil, the central longitudinal axis of which runs in the radial direction. The result is a magnetic flux which is oriented in the radial direction, and which, starting from each one of the multiple teeth, flows into the rotor through the air gap between stator and rotor.

A version, which agrees to this extent, of the stator, stator coils and rotor of a drive device for a valve arrangement in internal combustion engines is described in U.S. Pat. No. 5,129,369. Here too, stator teeth which are divided in the radial and tangential directions are each surrounded by a coil, the central longitudinal axis of which runs in the radial direction.

EP 0 485 231 A1 too shows a similar type of configuration of the stator, the stator coils and the rotor of a drive device for a valve. Here stator teeth which are divided in the radial and tangential directions are each surrounded by a radially oriented coil.

These arrangements require very high expenditure in production, since the mounting of the coils around the individual teeth is difficult to implement. The pole pitch which can be achieved with this structure is also relatively great. A cylindrical element which is fixed to the valve contains multiple closed secondary coils, which are held in a magnetic core of pressed or sintered magnetic powder without a predetermined magnetic orientation.

From DE 10 2004 003 220 A1 (Continental Teves), a valve drive for a gas exchange valve is known, with a magnetic rotor, which extends so that it can move longitudinally with a rotor section which is remote from the gas exchange valve within a bushing of a stator, which is provided with a current coil. The valve drive has a toothed area which forms a magnet yoke, and with a rotor end, which projects out of the stator in the direction of the gas exchange valve, said rotor actuating the gas exis change valve when a current coil is excited. In the area of the rotor section, the rotor is implemented as a rotor plate which is moved vertically in the stator, and in which multiple magnet pieces are aligned in multiple planes. On both sides of the rotor section, pairs of current coils, the central longitudinal axis of which is oriented parallel to the rotor motion, are arranged. Transversely to the current coils, on their faces, stator plates with toothed areas facing the rotor are arranged.

From WO98/55741, an electrical travelling-wave motor having a rotor and a stator is known. The stator is built from metal sheets, the surface of which is oriented vertically to the direction of motion of the rotor. The stator has teeth, which face the rotor, which is in the form of a synchronous or asynchronous rotor, said teeth each having a closed lateral cylinder surface which faces the rotor. Between each pair of adjacent teeth of the stator, stator coil chambers are formed, and in each of them a coil, which is oriented parallel to the surface of the metal sheets, is arranged.

From U.S. Pat. No. 6,039,014, a linear motor is known. In this case a stator of the linear motor has multiple coils, which are each separated from each other by a ferromagnetic housing section. A rotor is constructed from multiple sections consisting of a permanently magnetic material, sections consisting of a ferromagnetic material being arranged between them.

Further documents showing the technical background of the invention are, without claiming completeness: DE 33 07 070 A1, DE 35 00 530 A1, EP 244 878 B1, WO 90/07635, U.S. Pat. No. 4,829,947, EP 377 244 B1, EP 347 211 B1, EP 390 519 B1, EP 328 194 B1, EP 377 251 B1, EP 312 216 B1, U.S. Pat. No. 4,967,702, U.S. Pat. No. 3,853,102, DE 10 2004 003220 A1, U.S. Pat. No. 4,829,947, U.S. Pat. No. 4,915,015, WO 90/07637, EP 244 878 B1, EP 328 195 A2.

PROBLEM ON WHICH THE INVENTION IS BASED

All designs which are described in the above-mentioned documents have in common that with them the lifting, pushing and dynamics, which are required for many application areas, are not achieved with sufficiently compact construction and high reliability. Additionally, known arrangements are very cost-intensive in production, and require a lot of space.

SOLUTION ACCORDING TO THE INVENTION

To remove these disadvantages, the invention teaches a linear actuator which is defined by the features of claim 1.
Structure, Further Developments and Advantages of the Solution According to the Invention According to the invention, the linear actuator has a rotor and a stator. The stator is at least partly formed of a soft magnetic material, and has at least one pair of teeth with teeth opposite each other, each pair of teeth receiving a stack between them, forming an air gap. The stator has at least two magnetically conducting inner areas, which at their ends facing the rotor have at least one of the teeth, and which are arranged at a predetermined distance from each other in the direction of motion of the rotor. The inner areas are at least partially surrounded by a substantially hollow cylindrical coil arrangement, the central longitudinal axis of which is oriented approximately transversely to the direction of motion of the rotor. In its simplest version, the rotor has a stack of permanently magnetic rods which are arranged one above another. Laterally next to it, on one side of the rotor, the coil arrangement of the stator and the at least two magnetically conducting inner areas which are surrounded by the coil arrangements is arranged, the rotor having at least one stack of permanently magnetic rods which are arranged one above another, and adjacent rods of a stack having an alternating magnetic orientation, which is essentially is aligned with the central longitudinal axis of two opposite teeth of a tooth pair.

The invention has recognised that in the case of such an arrangement, the two coil arrangements can be operated so that the magnetic flux through one of the two magnetically conducting inner areas is at every instant essentially equal and opposite is to the magnetic flux through the other magnetically conducting inner area. Thus the total arrangement of the two coil arrangements with the associated stator arrangement, in interaction with the permanently magnetic rotor rods, forms a self-enclosed magnetic circuit. In other words, with the invention, the magnetic flux which is induced by one coil arrangement in one direction can be simultaneously induced by the other coil arrangement in the other direction, so that the circuit is closed.

According to the invention, the rotor can have two or more stacks of permanently magnetic rods which are arranged at a predetermined distance from each other, and the magnetically conducting inner areas of the stator can be arranged between the stacks of the rotor.

Another concept on which the invention is based consists of "separating out" that part of the stator which effects the armature magnetomotive force, namely the coil area with the stator coil arrangement, spatially from the part which forms the force of the linear actuator, namely the toothed area of the stator. Thus, in comparison with traditional linear motors, in which the stator coils are each arranged between two teeth of the stator, a considerably higher armature magnetomotive force can be achieved. This is because the coil, because of the form according to the invention, has considerably fewer spatial restrictions, and can thus be optimised to minimum (ohmic) losses, and associated maximum magnetic flux induction. The arrangement of the stator coil arrangement, the central longitudinal axis of which is oriented transversely to the direction of motion of the rotor, or in other words is essentially aligned with the central longitudinal axis of two opposite teeth of a tooth pair, is magnetically specially efficient, because the magnetic flux which is induced by a coil in such an orientation flows equally through the tooth pairs on the two faces of the coil. Thus a corresponding force is generated in both stacks of permanently magnetic rods. With no other special steps, this prevents the rotor running skew.

The invention also provides that the hollow cylindrical coil arrangement has an essentially rectangular cross-section when seen along its central longitudinal axis M. Thus a coil, the outer contour of which is essentially rectangular, with a recess which is also essentially rectangular, encloses the appropriate magnetically conducting inner areas of the stator.

The dimensions of the permanently magnetic rods in the direction of motion of the rotor, and the dimensions of a tooth of the stator in the direction of motion of the rotor, define a pole pitch which is smaller than the measurement of the stator coil in its longitudinal direction.

Similarly, the rotor magnetic pole/stator tooth arrangements, which cause the force and movement, are concentrated, so that they are not interrupted by stator coil arrangements. This allows a very small pole pitch, which in turn causes a high force density. Additionally, with the arrangement according to the invention, partial liftings of the rotor are possible.

Another essential advantage of the linear actuator according to the invention is that practically only the magnetically active components (the permanent magnets) contribute to the inert mass of the rotor, whereas all other parts of the motor (coils, magnetic return path, etc.) are assigned to the stator. In this way, a specially high ratio of force exerted by the actuator to inert mass can be achieved.

Because of the arrangement (single-phase and hollow cylindrical, e.g. rectangular in cross-section), which can be simply formed, of the stator coil arrangements, it is possible to keep the effect of the jarring forces acting on the coil low, so that vibrations of the coil or friction of the coil on the wall of the stator coil chamber are small. It is thus possible to manage with minimum insulation material and lining material of the stator coil chamber. This too contributes to the compactness and reliability of the is total arrangement. Additionally, the simple structure results in a high power density even in the case of small linear actuators, since the achievable fill factor of the stator coil chamber (coil volume in the stator coil chamber relative to the total volume of the stator coil chamber) is high.

According to the invention, each tooth can have, in the direction of motion of the rotor, a measurement which essentially agrees with the measurement of a permanently magnetic rod in the direction of motion of the rotor, so that in a predetermined position of the rotor, at least one tooth pair of the stator is aligned with at least one permanently magnetic rod.

Preferably, in the direction of motion of the rotor, adjacent tooth pairs of the stator are dimensioned, relative to the measurement of the permanently magnetic rods in the direction of motion of the rotor, so that between two permanently magnetic rods, which are aligned with two mutually adjacent tooth pairs of the stator, at least one other of the permanently magnetic rods is arranged.

According to the invention, the magnetically conducting inner areas, at their ends facing the rotor, can have at least one of the teeth. In the case of a rotor with two or more stacks, the magnetically conducting inner areas of the stator, between the two stacks, have the teeth at their ends facing the stacks of the rotor.

In the case of a rotor with two stacks, the stator can also have two magnetically conducting outer areas which are outside the two stacks of the rotor, and which have the teeth at their ends facing the stacks.

According to the invention, the outer area of the stator, at least in one sub-section, is essentially comb-shaped in cross-section. The teeth of the comb form the outer teeth of the tooth pairs.

According to the invention, the central longitudinal axis of the coil arrangement can be oriented approximately transversely to the direction of motion of the rotor. Similarly, according to the invention the central longitudinal axis of the coil arrangement can be approximately aligned with the central longitudinal axis of two mutually opposite teeth of a tooth pair, or at least in sections be oriented essentially parallel to it. This allows a bent shape of the inner areas of the stator, e.g. to obtain corresponding assembly space for the coil arrangements.

The predetermined distance between the two magnetically conducting inner areas can be dimensioned, in conformity with the invention, so that it essentially agrees with the measurement of an even number of permanently magnetic rods of the two stacks in the direction of motion of the rotor.

According to the invention, in each case, two adjacent permanently magnetic rods of the two stacks of the rotor can be connected to each other by magnetically inactive spacers, at a predetermined distance. These spacers can contain a magnetically inactive light material (aluminium, titanium, plastic—also with glass fibre or carbon fibre inclusions—or similar). In this way the inert mass of the rotor is low, but its stability is high.

According to the invention, because of the measurements of the permanently magnetic rods in the direction of motion of the rotor and the measurements of the teeth of the stator in the direction of motion of the rotor, a pole pitch which is smaller than the measurement of the stator coil arrangement in the direction of motion of the rotor can be defined.

According to the invention, the outer area(s) of the stator can have, in addition to or instead of the inner areas of the stator, at least one stator coil.

According to the invention, the measurement of the coil arrangement of the stator in the direction of motion of the rotor can be greater than the distance between two adjacent tooth pairs of the stator.

Because of the practically exclusively two-dimensional magnetic flux course through the stator, the stator (the inner and/or outer magnetically conducting area) is preferably constructed from electrical sheet parts. However, it is also possible to produce it, at least partly, as a soft magnetic mould, preferably of pressed and/or sintered metal powder.

According to the invention, the outer areas of the stator at least partly form a magnetic return path body, Because of the high power density of the arrangement according to the invention, the transverse measurements of the linear actuator, with the necessary power data, can be kept very small. This allows use in restricted spaces.

Other features, properties, advantages and possible modifications are explained on the basis of the following description, which refers to the attached drawings.

DETAILED DESCRIPTION OF THE CURRENTLY PREFERRED EMBODIMENTS

Figure 1:
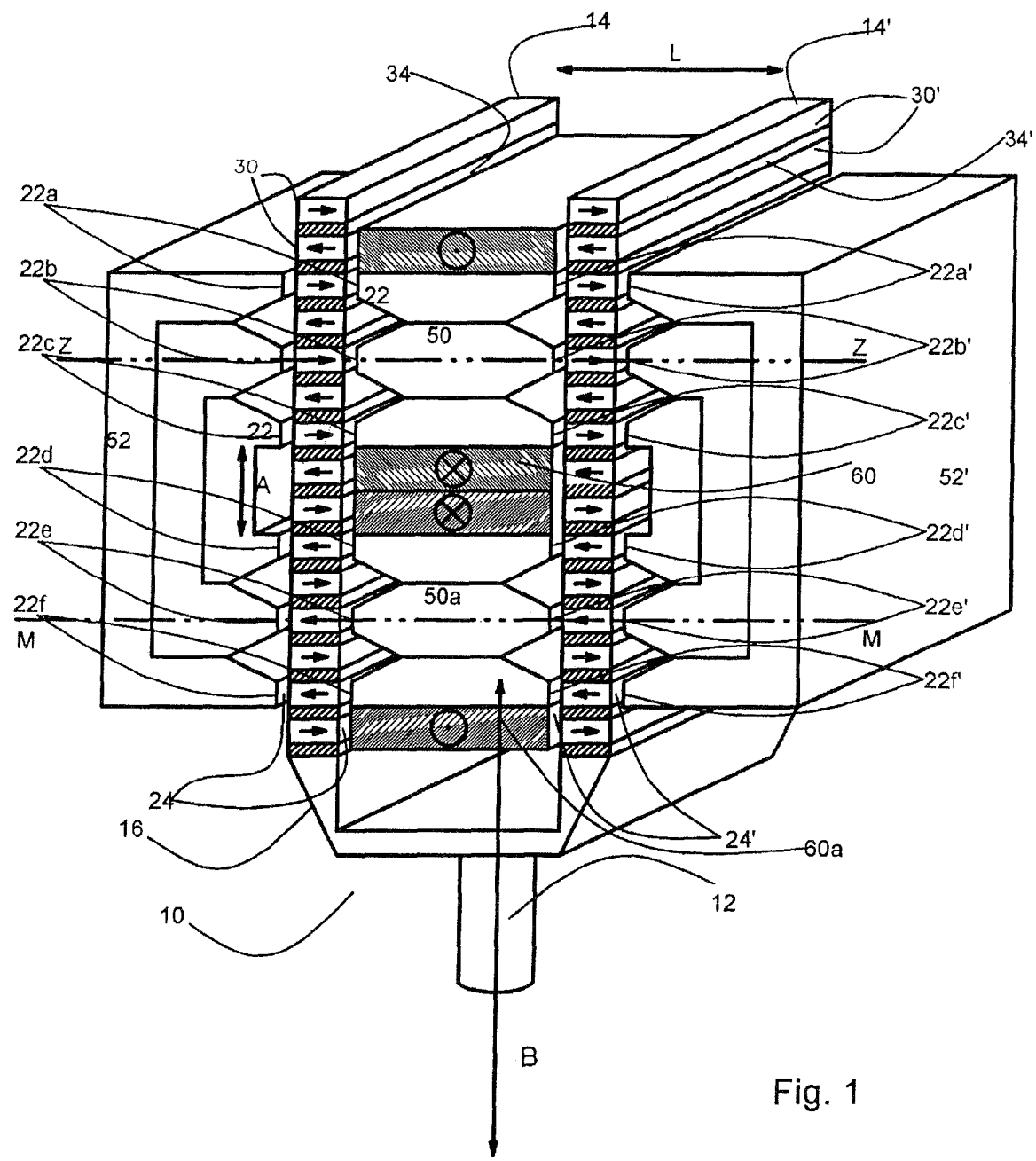
In FIG. 1, an embodiment of a linear actuator according to the invention is illustrated schematically in perspective longitudinal view.

In FIG. 1, a first embodiment of an electrical linear actuator 10, which has a rotor 16 and a stator 18 which are connected via a rod 12a to a part (not illustrated) to be driven, is illustrated. Those skilled in the art understand that the term "rotor" is used broadly to identify a moving element even though the motion is translational and or rotational. In the following description the rotor 16 translates and reciprocates along its axis.

The rotor 16 has two parallel stacks 14, 14', which are arranged at a distance L from each other, of multiple permanently magnetic rods 30, 30', which are of essentially cuboidal shape and arranged one above another.

The stator 18 is in the form of a soft magnetic mould of sintered ferrous metal powder or layered iron sheets. The stator 18 has multiple tooth pairs 22a, 22a'; 22b, 22b'; 22c, 22c'; 22d, 22d'; 22e, 22e'; 22f, 22f with teeth 22 opposite each other. Between the teeth 22 of each tooth pair, one of the two stacks 14, 14' is received, forming an air gap 24 and 24' respectively.

Between the two stacks 14, 14' of the rotor 16, the stator 18 has magnetically conducting inner areas 50, 50a, which are arranged at a predetermined distance A from each other in the direction of motion B of the rotor 16. Each of the two inner areas 50, 50a of the stator 18 is surrounded by an essentially hollow cylindrical coil arrangement 60, 60a. The central longitudinal axis M of each of the coil arrangements 60, 60a runs approximately transversely to the direction of motion B of the rotor 16. To achieve as high a fill factor as possible, the coil arrangement 60, 60a is implemented as a copper band coil.

Current must be applied to the two coil arrangements 60, 60a so that they each generate a magnetic field in opposite directions. In FIG. 1, the upper coil arrangement 60, in the shown position of the rotor 16, generates a magnetic field which is essentially oriented from left to right along the central longitudinal axis of the coil arrangement 60, whereas the lower coil arrangement 60a, in the shown position of the rotor 16, generates a magnetic field which is essentially oriented from right to left along the central longitudinal axis of the coil arrangement 60. This alternates, to is drive the rotor 16 along the direction of motion B (up or down).

Figure 2:
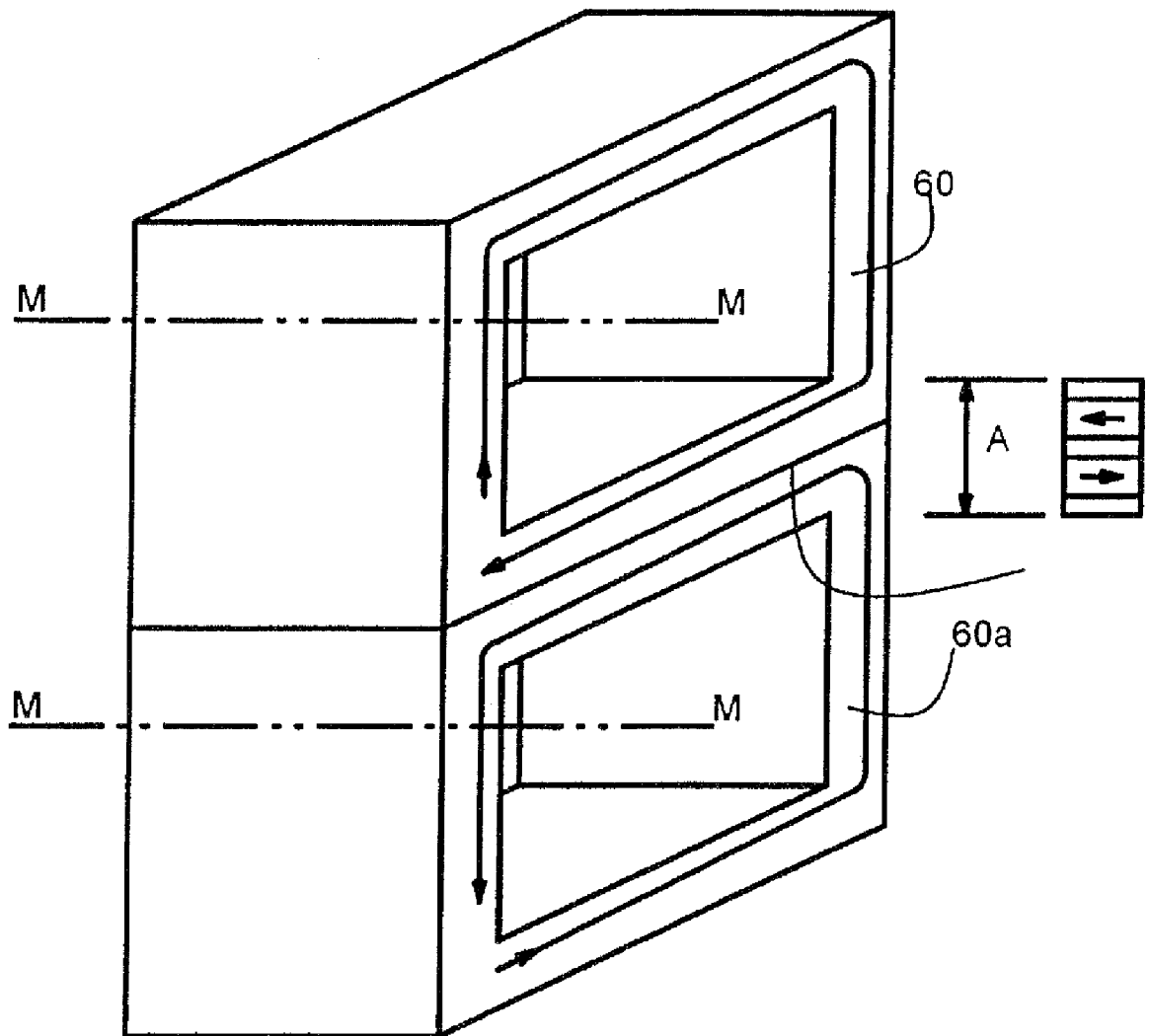
In FIG. 2, an embodiment of a coil arrangement of the linear actuator according to the invention is illustrated schematically in perspective plan view, In FIG. 3, an embodiment of a stator of the linear actuator according to the invention is illustrated schematically in perspective plan view.
Figure 4:
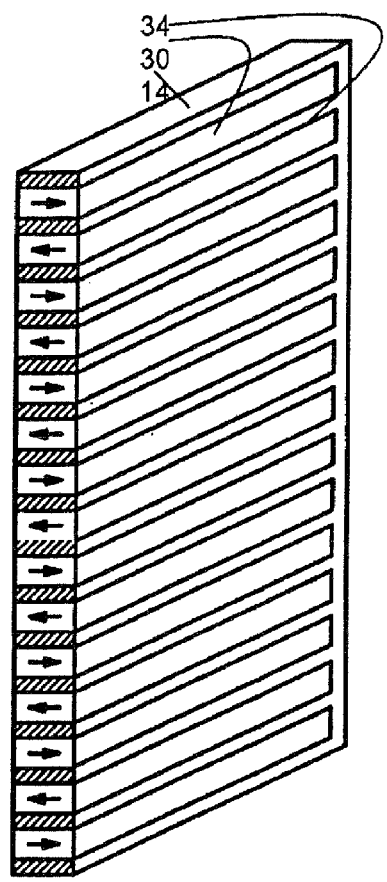
In FIG. 4, an embodiment of a stack of magnetic rods of the linear actuator according to the invention is illustrated schematically in perspective plan view.

Since each coil arrangement 60, 60a, over its whole extent, completely surrounds the appropriate one of the two inner areas 50, 50a of the stator 18, it can be filled with maximum winding space. As illustrated in FIGS. 1 and 2 by corresponding arrows—or arrow tips and arrow ends—current must flow through the two coil arrangements 60, 60a so that in the central section 64, in which they are adjacent to each other, they each carry current in the same direction (see FIG. 2).

In the shown arrangement, the rotor 16 is formed from two stacks 14, 14' which are in parallel alignment, and the magnetic rods of which are formed from permanently magnetic material (e.g. samarium-cobalt). The individual magnetic rods 30 are in a flush arrangement one above another, the magnetic orientation of the magnetic rods 30 being aligned alternately (from the inner area of the stator 18 outward and vice versa). Additionally, the dimensions of the magnetic rods 30 are such that in a predetermined position of the rotor 16, one of the magnetic rods 30 is aligned between two teeth 22 of a tooth pair of the stator 18. Adjacent rods 30, 30' of a stack 14, 14' have an alternating magnetic orientation N->S, S<-N. Thus in specified positions of the rotor 14, each of these rods is aligned with teeth 22 of the stator 18. Also, in these alignment positions, the central longitudinal axis Z of two opposite teeth 22 of a tooth pair essentially coincides with the magnetic orientation of the appropriate aligned rod. It can also be seen that the central longitudinal axis M of the coil arrangement 60 is oriented approximately transversely to the direction of motion of the rotor 16, and is approximately aligned with the central longitudinal axis of two mutually opposite teeth of a tooth pair.

Between two adjacent magnetic rods 30 of a stack 14, 14', to reduce the inert mass of the rotor 16, magnetically inactive, likewise cuboidal spacers 34, 34' of plastic, e.g. carbon fibre reinforced plastic, are inserted. The mutually adjacent permanently magnetic rods 30 and the magnetically inactive spacers 34, 34' are permanently connected to each other. In other words, in the movable part of the actuator (the rotor), there are no parts (e.g. flux concentrating pieces) which conduct magnetic flux, but only permanent magnets, which are always arranged optimally in the magnetic field. This arrangement also has the advantage of saving weight. If cuboidal rods of permanently magnetic material are not available with sufficient magnetic field strength, according to the invention it is also possible to put the rods together out of permanent magnet segments, so that a directed (from inside to outside or vice versa) magnetic field transversely to the direction of motion of the rotor 16 results.

The stator 18 also has two magnetically conducting outer areas 52, 52', which are outside the two stacks 14, 14' of the rotor 16, and because of the practically exclusively two-dimensional magnetic flux conduction are preferably produced as packets of iron sheets. However, it is also possible to mould them as soft magnetic moulds of sintered ferrous metal powder. These outer areas 52, 52' of the stator 18 are essentially comb-shaped in cross-section, and at their ends facing the stacks 14, 14' of the rotor 16 have teeth 22, which in shape correspond to the mirror image of the teeth of the inner areas 50, 50a of the stator 18.

Between the two magnetically conducting inner areas 50, 50a, there is a predetermined distance A, which is dimensioned so that it essentially agrees with the measurement of an even number (two in the shown embodiment) of permanently magnetic rods 30, 30' of the two stacks 14, 14' (with associated spacers) in the direction of motion B of the rotor 16. The length of the outer areas 52, 52', which are comb-shaped in cross-section, of the stator 18 is dimensioned so that the corresponding teeth 22, which face the magnetic rods of the rotor 16, at both ends are opposite a magnetic rod of different orientation. In other words, in a specified position of the rotor, the teeth 22 of the tooth pair 22d are aligned with an outwardly oriented magnetic rod, whereas the teeth 22 of the corresponding tooth pair 22c are aligned with an inwardly oriented magnetic rod. Correspondingly, the teeth 22 of the tooth pair 22e correspond to the teeth 22 of the tooth pair 22b, and the teeth 22 of the tooth pair 22f correspond to the teeth 22 of the tooth pair 22a. The outer areas 52 of the stator 18 thus form one magnetic return path body. In FIG. 1, the comb-shaped areas of the outer areas 52, 52' of the stator 18 are illustrated as three individual C-shaped yokes which are plugged into each other. However, it is also possible to form each of the two outer areas 52, 52' of the stator 18 as a packet of one-piece soft magnetic comb-shaped metal sheets, each of which has the teeth. An essential advantage of the arrangement according to the invention of the outer area(s) of the stator 18 is that practically no stray magnetic flux is output to the environment. This is specially important in the case of arrangements where multiple such linear actuators are positioned on a dense space, and are driven differently from each other. This applies, for instance, to a multi-valve cylinder of an internal combustion engine.

Figure 3:
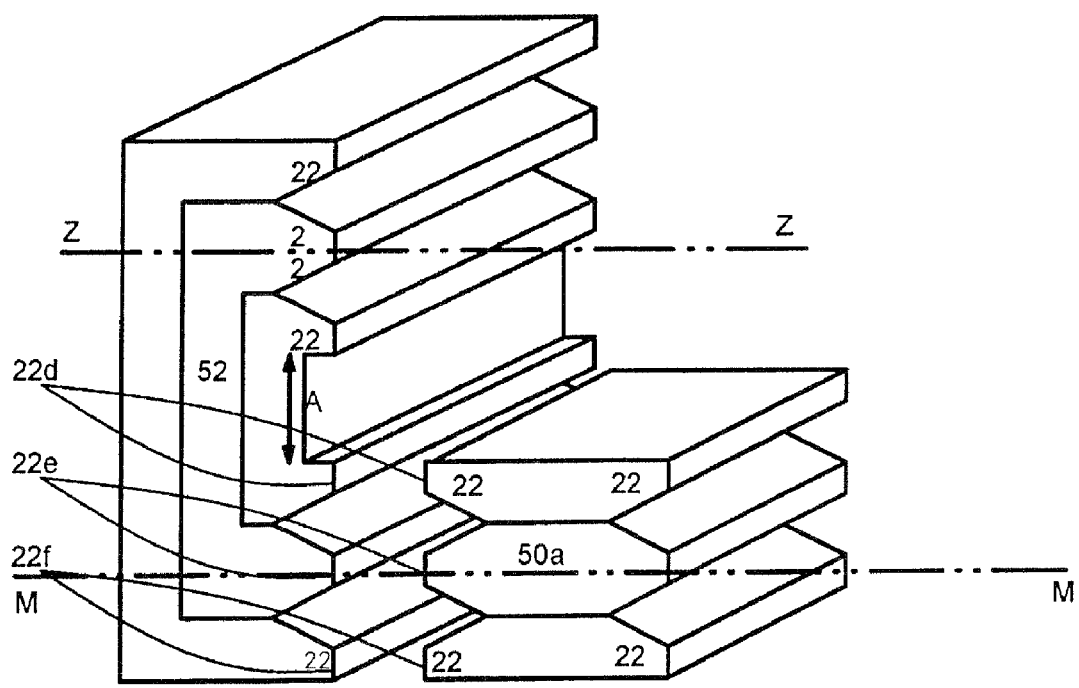

For better illustration, in FIG. 3 the stator 18 is shown with its inner 50, 50a and outer areas 52, 52' exposed. One of the outer areas 52' and the upper inner area 50 are omitted. The drawings do not illustrate, but it is within the scope of the invention, that the outer areas 52, 52' of the stator 18 have, in addition to or instead of the inner areas 52 of the stator 18, at least one stator coil. Visibly, the measurement of the coil arrangement 60, 60a in the direction of motion of the rotor 16 is greater than the distance between two adjacent tooth pairs of the stator 18.

Figure 5:
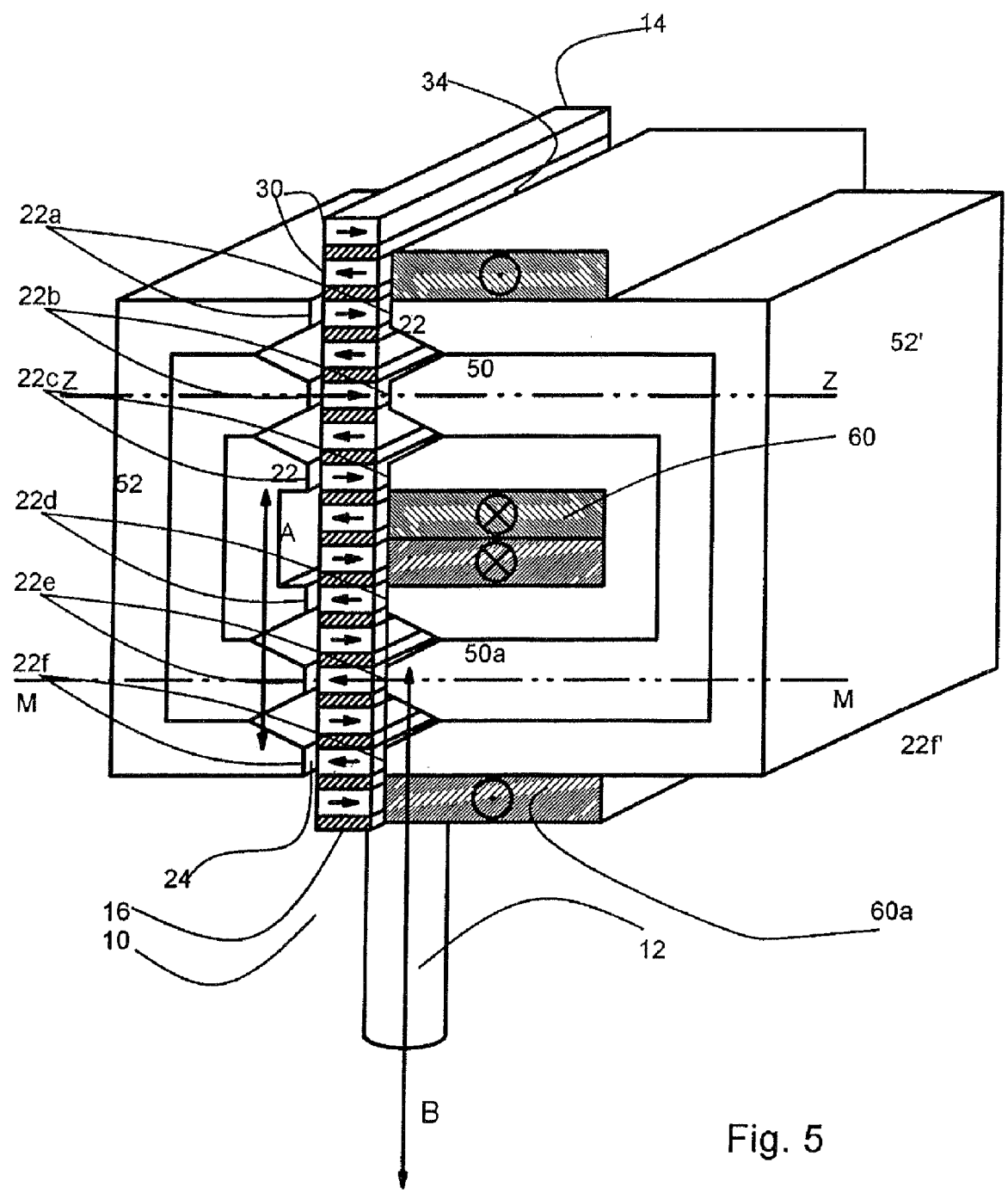
In FIG. 5, an embodiment of a linear actuator according to the invention is illustrated schematically in perspective longitudinal view.

In FIG. 5, a second embodiment of an electrical linear motor 10 is illustrated. The reference symbols which are used in the previous figures designate parts or components with the same or comparable function or method of working, and are therefore explained below only to the extent that their tangible form, function or method of working differs from what is described above.

In the case of this embodiment, the rotor 16 has a stack 14 of multiple permanently magnetic rods 30, which arranged one above another and of essentially cuboidal shape. The stator 18 is in the form of a soft magnetic sheet metal packet stack. The stator 18 has multiple tooth pairs 22a . . . 22f with mutually opposite teeth 22. Between the teeth 22 of a tooth pair, the stack 14 is received, forming an air gap 24 and 24' respectively.

On one side of the stack 14 of the rotor 16 (on the right-hand side in FIG. 5), the stator 18 has two magnetically conducting inner areas 50, 50a, which in the direction of motion B of the rotor 16 are arranged at a predetermined distance A from each other. Each of the two inner areas 50, 50a of the stator 18 is surrounded by an essentially hollow cylindrical coil arrangement 60, 60a. These two inner areas 50, 50a of the stator 18 practically form the legs of a "U" on its side, its connecting yoke being formed by a magnetically conducting outer area 52'. In other words, in this embodiment, the second stack of the rotor is omitted, and the stator iron is formed continuously. The outer area 52 of the stator 18, outside the rotor 16, is essentially comb-shaped in cross-section, and at its end facing the stack 14 of the rotor 16 has teeth 22, which in shape correspond to the mirror image of the teeth of the inner areas 50, 50a of the stator 18.

In this embodiment too, between the magnetically conducting inner areas 50, 50a, there is a predetermined distance A, which is dimensioned so that it essentially agrees with the measurement of an even number (two in the shown embodiment) of permanently magnetic rods 30, 30' of the two stacks 14, 14' (with associated spacers) in the direction of motion B of the rotor 16. Similarly, the length of the outer areas 52, 52', which are comb-shaped in cross-section, of the stator 18 is dimensioned so that the corresponding teeth 22, which face the magnetic rods of the rotor 16, at both ends are opposite a magnetic rod of different orientation.

The explained embodiments are specially suitable for implementing the required lift of about 10-200 mm with the required dynamics in relatively narrow space.

Above, linear actuators for single-phase operation are described. However, it is also within the scope of this invention to form a two-phase or multi-phase arrangement of the linear actuator. For this purpose, the teeth of another stator system, with associated coils, must be positioned geometrically along the magnet of the rotor, with displacement corresponding to the intended phase displacement(s) of the electrical driving power.

For a person skilled in the art, it is understood that individual aspects or features of the various embodiments described above can also be combined with each other. Those skilled in the art also understand that the terms "armature" and "rotor" are used interchangeably to identify the moving element 16 in the linear actuator.

In the following claims reference numbers appear only for heuristic purposes and do not limit the scope of the claims to the referenced elements in the specification.

The invention claimed is:

1. A linear actuator comprising an armature (16) and a stator (18), wherein: the armature (16) having at least two stacks (14, 14') of permanently magnetic rods (30, 30') arranged one over another;
the stator (18) having magnetically conducting inner (50, 50a) and outer (52, 52') areas;
the stator is at least partly formed of a soft magnetic material, has at least one pair of teeth (22a, 22a'; 22b, 22b'; 22c, 22c'; 22d, 22d'; 22e, 22e'; 22f, 22f') with teeth (22) opposite each other; each pair of teeth receiving a stack (14, 14') between them, forming an air gap (24, 24');
the stator also having at least two magnetically conducting inner areas (50, 50a), which at their ends facing the armature (16) have at least one of the teeth (22), and which are arranged at a predetermined distance (A) from each other in the direction of motion (B) of the armature (16), and which are at least partially surrounded by a substantially hollow cylindrical coil arrangement (60, 60a);
the hollow cylindrical coil arrangement having a central longitudinal axis (M) and magnetic flux which are oriented approximately transversely to the direction of motion (B) of the armature (16), and at least in sections essentially parallel to the central longitudinal axis of two teeth opposite each other of a tooth pair;
wherein adjacent rods (30, 30') of a stack (14, 14') of the armature (16) have an alternating magnetic orientation (N->S, S<-N), and are essentially aligned with a central longitudinal axis (Z) of two mutually opposite teeth (22) of a tooth pair (22a, 22a'; 22b, 22b'; 22c, 22c'; 22d, 22d'; 22e, 22e'; 22f, 22f');

the inner areas (50, 50a) of the stator (18) are between the stacks (14, 14') of the armature (16) and have teeth on their ends facing the stacks (14, 14');

the stator (18) having at least two magnetically conducting outer areas which are outside the stack (14, 14') of the armature (16), and which have, at their ends facing the stacks (14, 14') of the armature (16), at least one of the teeth;

the outer areas (52) of the stator (18) are comb-shaped and form a magnetic return path body in the direction of motion of the armature (16) and are in the form of C-shaped yokes which are plugged into each other, and each coil arrangement (60, 60a) completely surrounds the appropriate one of the two inner areas (50, 50a) of the stator (18).

2. A linear actuator, comprising an armature (16) and a stator (18) wherein:

the armature (16) has at least one stack (14, 14') of permanently magnetic rods (30, 30') arranged one over another;

the stator (18) has magnetically conducting inner (50, 50a) and outer (52, 52') areas, is at least partly formed of a soft magnetic material, has at least one pair of teeth (22a, 22a'; 22b, 22b'; 22c, 22c'; 22d, 22d'; 22e, 22e'; 22f, 22f') with teeth (22) opposite each other;

each pair of teeth receiving a stack (14) of the armature between them and forming an air gap (24, 24') which has at least two magnetically conducting inner areas (50, 50a), which at their ends facing the armature (16) have at least one of the teeth (22), and which are arranged at a predetermined distance (A) from each other in the direction of motion (B) of the armature (16), and which are at least partially surrounded by a substantially hollow cylindrical coil arrangement (60, 60a);

the substantially hollow cylindrical coil arrangement having a central longitudinal axis (M) and magnetic flux of which are oriented approximately transversely to the direction of motion (B) of the armature (16), and at least in sections essentially parallel to the central longitudinal axis of two teeth opposite each other of a tooth pair;

wherein adjacent rods (30, 30') of a stack of the armature (16) have an alternating magnetic orientation (N->S, S<-N), and are essentially aligned with a central longitudinal axis (Z) of two mutually opposite teeth (22) of a tooth pair (22a, 22a'; 22b, 22b'; 22c, 22c'; 22d, 22d'; 22e, 22e'; 22f, 22f'), on one side of the stack (14) of the armature (16);

the stator (18) having two magnetically conducting inner areas (50, 50a), which are arranged at a predetermined distance (A) from each other in the direction of motion (B) of the armature (16), and which have, at their ends facing the armature (16), at least one of the teeth (22);

each of the two inner areas (50, 50a) of the stator (18) is surrounded by an essentially hollow cylindrical coil arrangement (60, 60a), a central longitudinal axis (M) and magnetic flux of which are oriented approximately transversely to the direction of motion (B) of the armature (16), and at least in sections are oriented essentially parallel to the central longitudinal axis of two mutually opposite teeth of a tooth pair, wherein the two inner areas (50, 50a) of the stator (18) form the legs of a "U" on its side, its connecting yoke being formed by a magnetically conducting outer area (52');

outer area (52) of the stator (18) disposed outside the armature (16) is essentially comb-shaped in cross-section, and at its end facing the stack (14) of the armature (16) has teeth (22), which in shape correspond to the mirror image of the teeth of the inner areas (50, 50a) of the stator (18), and the outer areas (52, 52') of the stator (18) are comb-shaped, form a magnetic return path in the direction of motion of the armature, and are in the form of yokes which are plugged into each other.

3. A linear actuator according to claim 1 or 2 wherein the armature (16) has two or more permanently magnetic rods (30, 30') which are arranged in a stack (14, 14') at a predetermined distance from each other, and the magnetically conducting inner areas (50, 50a) of the stator (18) are arranged between the stacks (14, 14') of the armature (16).

4. A linear actuator according to claim 2, wherein the hollow cylindrical coil arrangement (60, 60a) has an essentially rectangular cross-section.

5. A linear actuator according to claim 4, wherein each tooth (22) has, in the direction of motion B of the armature (16), a measurement which essentially agrees with the measurement of a permanently magnetic rod (30, 30') in the direction of motion B of the armature (16), so that in a predetermined position of the armature (16), at least one tooth pair of the stator (18) is aligned with a permanently magnetic rod (30, 30').

6. A linear actuator according to claim 5, wherein in the direction of motion B of the armature (16), adjacent tooth pairs of the stator (18) are dimensioned, relative to the measurement of the permanently magnetic rods (30, 30') in the direction of motion B of the armature (16), so that between two permanently magnetic rods, which are aligned with two mutually adjacent tooth pairs of the stator (18), at least one other of the permanently magnetic rods (30, 30') is arranged.

7. A linear actuator according to claim 1, wherein the predetermined distance A between the magnetically conducting inner areas (50, 50a) is dimensioned so that it essentially agrees with the measurement of an even number of permanently magnetic rods (30, 30') of the two stacks (14, 14') in the direction of motion B of the armature (16).

8. A linear actuator according to claim 1, wherein in each case, two adjacent permanently magnetic rods (30, 30') of the two stacks (14, 14') of the armature (16) are connected to each other by magnetically inactive spacers (34, 34'), at a predetermined distance.

9. Linear actuator according to claim 1, wherein because of the measurements of the permanently magnetic rods (30) in the direction of motion B of the armature (16) and the teeth (22) of the stator (18), a pole pitch which is smaller than the measurement of the stator coil (28) in the direction of motion B of the armature (16) is defined.

10. Linear actuator according to claim 1, wherein the outer areas (52) of the stator (18) have, in addition to or instead of the inner areas (52) of the stator (18), at least one stator coil (28).

11. Linear actuator according to claim 1, wherein the measurement of the coil arrangement (60, 60a) in the direction of motion of the armature (16) is greater than the distance between two adjacent tooth pairs of the stator (18).

12. Linear actuator according to claim 1, wherein the stator (18) is at least partly a soft magnetic mould, preferably of pressed and/or sintered metal powder.

* * * * *